US012561185B2

(12) United States Patent
Kumar et al.

(10) Patent No.: US 12,561,185 B2
(45) Date of Patent: Feb. 24, 2026

(54) FLEXIBLE APPLICATION PROGRAMING INTERFACE USING VERSIONING REQUEST AND RESPONSE TRANSFORMERS

(71) Applicant: Optum, Inc., Minnetonka, MN (US)

(72) Inventors: Thatha Pavan Kumar, Bangalore (IN); Venkateswara R. Kakula, Cumming, GA (US); Sahukari Kranthi Kiran Chowdhary, Chennai (IN); Lalitha Singh, Plymouth, MN (US); Praveen Kumar Modukuri, Hyderabad (IN)

(73) Assignee: Optum, Inc., Minnetonka, MN (US)

( * ) Notice: Subject to any disclaimer, the term of this patent is extended or adjusted under 35 U.S.C. 154(b) by 423 days.

(21) Appl. No.: 18/147,358

(22) Filed: Dec. 28, 2022

(65) Prior Publication Data

US 2024/0220338 A1     Jul. 4, 2024

(51) Int. Cl.
*G06F 9/54* (2006.01)
*G06F 8/71* (2018.01)

(52) U.S. Cl.
CPC ................ *G06F 9/541* (2013.01); *G06F 8/71* (2013.01)

(58) Field of Classification Search
CPC .................................. G06F 9/54; G06F 9/541
See application file for complete search history.

(56) References Cited

U.S. PATENT DOCUMENTS 7,949,999 B1 * 5/2011 Willeford ................ G06F 8/656
717/121
9,063,748 B1 6/2015 Bakale et al.

9,823,950 B1 * 11/2017 Carrier .................... G06F 9/543
10,360,082 B2 * 7/2019 Lincoln .................... G06F 9/541
10,769,000 B1 9/2020 Plunk et al.
11,088,914 B2 * 8/2021 Boddam ............. H04L 41/5054
11,228,573 B1 * 1/2022 Rangasamy ...... H04L 12/40006
2003/0177284 A1 * 9/2003 De Bonet ........... H04L 67/2871
719/328
2009/0298473 A1 * 12/2009 Choi .................... G06Q 10/107
455/418
2011/0078674 A1 3/2011 Ershov
2014/0244708 A1 8/2014 Taine et al.
(Continued)

FOREIGN PATENT DOCUMENTS

EP          3086242 A1 * 10/2016   ......... G06F 17/3043
WO   WO-2020026778 A1 *  2/2020   .............. G06F 8/311

OTHER PUBLICATIONS

Bustamante et al., "Managing Evolution of API-driven IoT Devices through Adaptation Chains", Nov. 9, 2020, pp. 85-95, URL: https://cibse2020.ppgia.pucpr.br/images/artigos/3/S03_P1.pdf.
(Continued)

*Primary Examiner* — Lewis A Bullock, Jr.
(74) *Attorney, Agent, or Firm* — Shumaker & Sieffert, P.A.

(57) ABSTRACT

A computer system and techniques used to support a variety of consumer systems using a variety of versions of an API using step-up request transforms and step-down response transforms. The computer system may be configured to receive a first application programming interface (API) request compatible with a first version of an API and transform, by first step-up request transformer, second step-up request transformer, a single handler, a first step-down response transformer, and a second step-down response transformer, into an API response sent to the requesting consumer system.

12 Claims, 6 Drawing Sheets

(56) References Cited

U.S. PATENT DOCUMENTS

| | | | | |
|---|---|---|---|---|
| 2014/0344340 | A1* | 11/2014 | Tang ..................... | G06F 9/5005 |
| | | | | 709/203 |
| 2014/0366011 | A1 | 12/2014 | Rector et al. | |
| 2017/0161059 | A1 | 6/2017 | Wood et al. | |
| 2017/0220336 | A1* | 8/2017 | Chen ......................... | G06F 8/70 |
| 2017/0364331 | A1 | 12/2017 | Chauhan et al. | |
| 2018/0232404 | A1* | 8/2018 | Bhatti ................. | G06F 16/9024 |
| 2018/0373862 | A1* | 12/2018 | Feijoo ................... | H04L 63/205 |
| 2020/0313996 | A1 | 10/2020 | Krishan et al. | |
| 2021/0173723 | A1 | 6/2021 | Devine et al. | |
| 2021/0224145 | A1* | 7/2021 | Warmack ............ | G06F 9/44505 |
| 2021/0248019 | A1* | 8/2021 | Gilling .................... | G06F 9/541 |
| 2022/0116480 | A1* | 4/2022 | Crisan ..................... | G06F 9/541 |
| 2022/0129331 | A1 | 4/2022 | Goodwin | |
| 2023/0093304 | A1* | 3/2023 | Brasburg ............... | G06F 9/541 |
| | | | | 717/120 |
| 2023/0106091 | A1* | 4/2023 | Shivashankara ........ | G06F 9/541 |
| | | | | 719/328 |
| 2023/0109053 | A1* | 4/2023 | Ross ................... | G06F 11/3409 |
| | | | | 718/100 |
| 2024/0118946 | A1* | 4/2024 | Take ......................... | G06F 8/30 |

OTHER PUBLICATIONS

Nguyen et al., "A Graph-based Approach to API Usage Adaptation", Oct. 17, 2010, 20 pp., URL: http://web.cs.ucla.edu/~miryung/Publications/oopsla10-libsync.pdf.

* cited by examiner

100

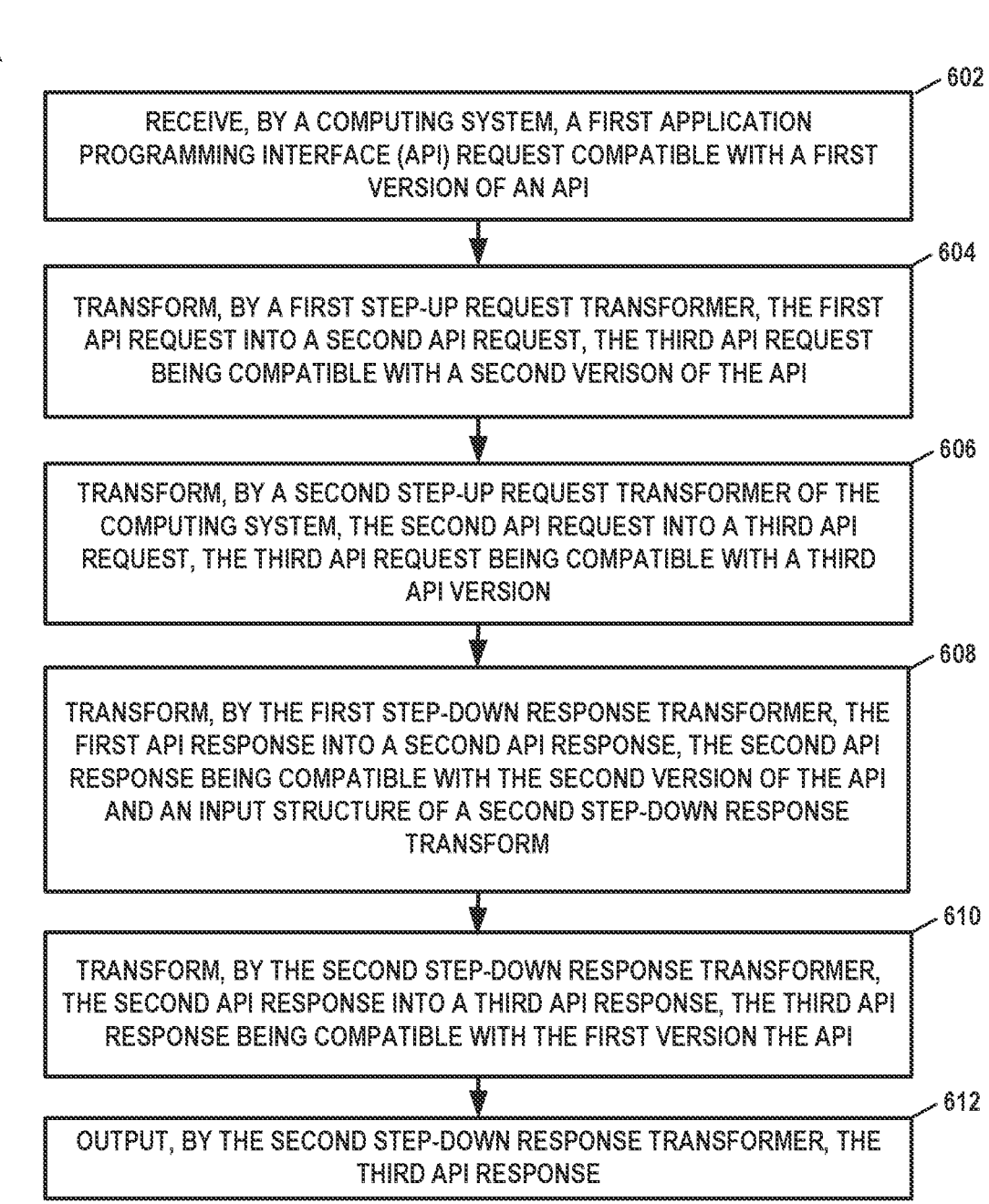

600

602
RECEIVE, BY A COMPUTING SYSTEM, A FIRST APPLICATION PROGRAMMING INTERFACE (API) REQUEST COMPATIBLE WITH A FIRST VERSION OF AN API

604
TRANSFORM, BY A FIRST STEP-UP REQUEST TRANSFORMER, THE FIRST API REQUEST INTO A SECOND API REQUEST, THE THIRD API REQUEST BEING COMPATIBLE WITH A SECOND VERISON OF THE API

606
TRANSFORM, BY A SECOND STEP-UP REQUEST TRANSFORMER OF THE COMPUTING SYSTEM, THE SECOND API REQUEST INTO A THIRD API REQUEST, THE THIRD API REQUEST BEING COMPATIBLE WITH A THIRD API VERSION

608
TRANSFORM, BY THE FIRST STEP-DOWN RESPONSE TRANSFORMER, THE FIRST API RESPONSE INTO A SECOND API RESPONSE, THE SECOND API RESPONSE BEING COMPATIBLE WITH THE SECOND VERSION OF THE API AND AN INPUT STRUCTURE OF A SECOND STEP-DOWN RESPONSE TRANSFORM

610
TRANSFORM, BY THE SECOND STEP-DOWN RESPONSE TRANSFORMER, THE SECOND API RESPONSE INTO A THIRD API RESPONSE, THE THIRD API RESPONSE BEING COMPATIBLE WITH THE FIRST VERSION THE API

612
OUTPUT, BY THE SECOND STEP-DOWN RESPONSE TRANSFORMER, THE THIRD API RESPONSE

FIG. 6

FLEXIBLE APPLICATION PROGRAMING INTERFACE USING VERSIONING REQUEST AND RESPONSE TRANSFORMERS

BACKGROUND

Application programming interface (API) development and deployment often utilizes multiple versions of a particular API. Users may interact with multiple API versions requesting responses with data from a common database or information repository. The format of the requests sent by the various API versions may be different in structure, limiting their compatibility. Similarly, the format of the responses received by the various API version may be different in structure, limiting their compatibility with various API versions.

Conventionally, separate and independent backend handlers would be developed for each API version. Each backend handler and respective backend source code would handle the interfacing between one API version and the commonly shared database or information repository. While effective, the development, deployment, and maintenance of independent backend info structure is often resource constrained. Many programmers may be needed to support such an expansive interface, often limiting the number of supported API versions and/or the length of time any particular API is supported.

SUMMARY

The present disclosure describes devices, systems, and methods for implementing a variety of application programming interface (API) versions having a less restrictive userbase of consumers than would be supported by typical implementing methods. Typical implementations of APIs restrict the userbase to consumers able to use at least one of the currently supported API versions. However, support for legacy versions is not sustainable due to the excessive demand for management resources needed to maintain compatibility with periodically changing backend software. Additionally, some consumers may be restricted from using a current API version, and custom adaptations are not feasible given the resource support needs. An unrestricted userbase is a userbase that includes consumers requiring custom version modifications or the use of legacy versions beyond typical support time frames. Releasing API(s) to a broad range of consumers poses challenges in updating and maintaining source code modifications directed to a specific version of the API. To support a broad range of consumers, a developer may try to maintain and support a variety of API versions used by different consumers. Software implemented by consumers may interact with a variety of API versions through API requests and API responses. While the request may come from any of the variety of API versions, the backend source code may be compatible with any request coming from a fielded API version. Similarly, the backend source code may be compatible with any fielded API version. Maintaining compatibility between consumers and the backend source code and databases may be handled by maintaining a variety of API versions with limited engineering resources. In accordance with the techniques of this disclosure, limiting the number of handlers needed to support interfaces between API versions, the backend source code, and databases may provide great benefits when maintaining multiple versions of an API with limited resources.

Using step-up request and step-down response transformers, the backend infrastructure support may be lessened to an amount of resources used to handle requests and responses compatible with the most current version of firmware. Backend compatibility with a single API version may be performed with a single handler. However, continuous support may still be demanded by the plurality of transformers, providing compatibility between legacy API versions and the most current API version. However, designing unique architectures of step-up request transformers and step-down response transformers, limits the resource demanded when releasing and supporting new API versions.

In some embodiments, a computer-implemented method includes receiving, by a computer system, a first API request compatible with a first version of an API; transforming, by a first step-up request transformer of the computer system, the first API request into a second API request, the second API request being compatible with a second version of the API and being an input to a second step-up request transformer of the computer system; transforming, by the second step-up request transformer, the second API request into a third API request, the third API request being compatible with a third version of the API and being an input to a handler; transforming, by a first step-down response transformer of the computer system, a first API response from the handler into a second API response, the first API response being compatible with the third version of the API, the second API response being compatible with the second version of the API and being an input to a second step-down response transformer of the computer system; transforming, by the second step-down response transformer, the second API response into a third API response, the third API response being compatible with the first version of the API; outputting, by the computer system, the third API response.

In some embodiments, a computer system includes one or more processors configured to: receive a first application programming interface (API) request compatible with a first version of an API; transform, via a first step-up request transformer, the first API request into a second API request, the third API request being compatible with a second version of the API and being an input to a second step-up request transformer; transform, via the second step-up request transformer of the computer system, the second API request into a third API request, the third API request being compatible with a third API version and being an input to a handler; transform, via a first step-down response transformer, a first API response from the handler into a second API response, the first API response being compatible with the third version of the API, the second API response being compatible with the second version of the API and an input format of a second step-down response transformer; transform, via the second step-down response transformer, the second API response into a third API response, the third API response being compatible with the first version of the API; output the third API response.

In some embodiments, a non-transitory computer-readable storage medium has executable instructions stored thereon that, when executed by processing circuitry of the device, causing the processing circuitry to: receive a first application programming interface (API) request compatible with a first version of an API; transform, via a first step-up request transformer, the first API request into a second API request, the third API request being compatible with a second version of the API and being an input to a second step-up request transformer; transform, via the second step-up request transformer of the computer system, the second API request into a third API request, the third API request being compatible with a third API version and being an input to a handler; transform, via a first step-down response transformer, a first API response from the handler into a second API response, the first API response being compatible with the third version of the API, the second API response being compatible with the second version of the API and an input format of a second step-down response transformer; transform, via the second step-down response transformer, the second API response into a third API response, the third API response being compatible with the first version of the API; output the third API response.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF THE DRAWINGS

FIG. 6 is a flowchart illustrating an example process for maintaining multiple versions of an API using a single handler, in accordance with one or more techniques of this disclosure.

DETAILED DESCRIPTION

Software may be developed and maintained using an application programming interface (API). An API may be upgraded by releasing iterative versions of the API. Each iterative version of an API may be developed and released, intended to address bugs, additional features, protocol changes or other programming changes. Several iterative versions of an API may be used and operated concurrently.

In some examples, an organization may operate iterative versions concurrently to support consumers using legacy versions of an API. Consumers may utilize different API versions for a variety of reasons. Some consumers may use legacy versions to limit costs associated with maintaining compatibility between more current version of an API and their frontend software. Supporting and maintaining multiple versions of an API may be resource intensive, especially when alterations are made to backend interfacing software.

Backend interfacing software may be a database, server software, or other computer program that stores, and supplies, data sent and requested by the various API versions. The various API versions may request data from a database, or other data storage medium, accessed by the backend interfacing software. Using the techniques of this disclosure, maintaining compatibility of various versions of an API with backend interfacing software, may be achieved with limited resources.

Figure 1:
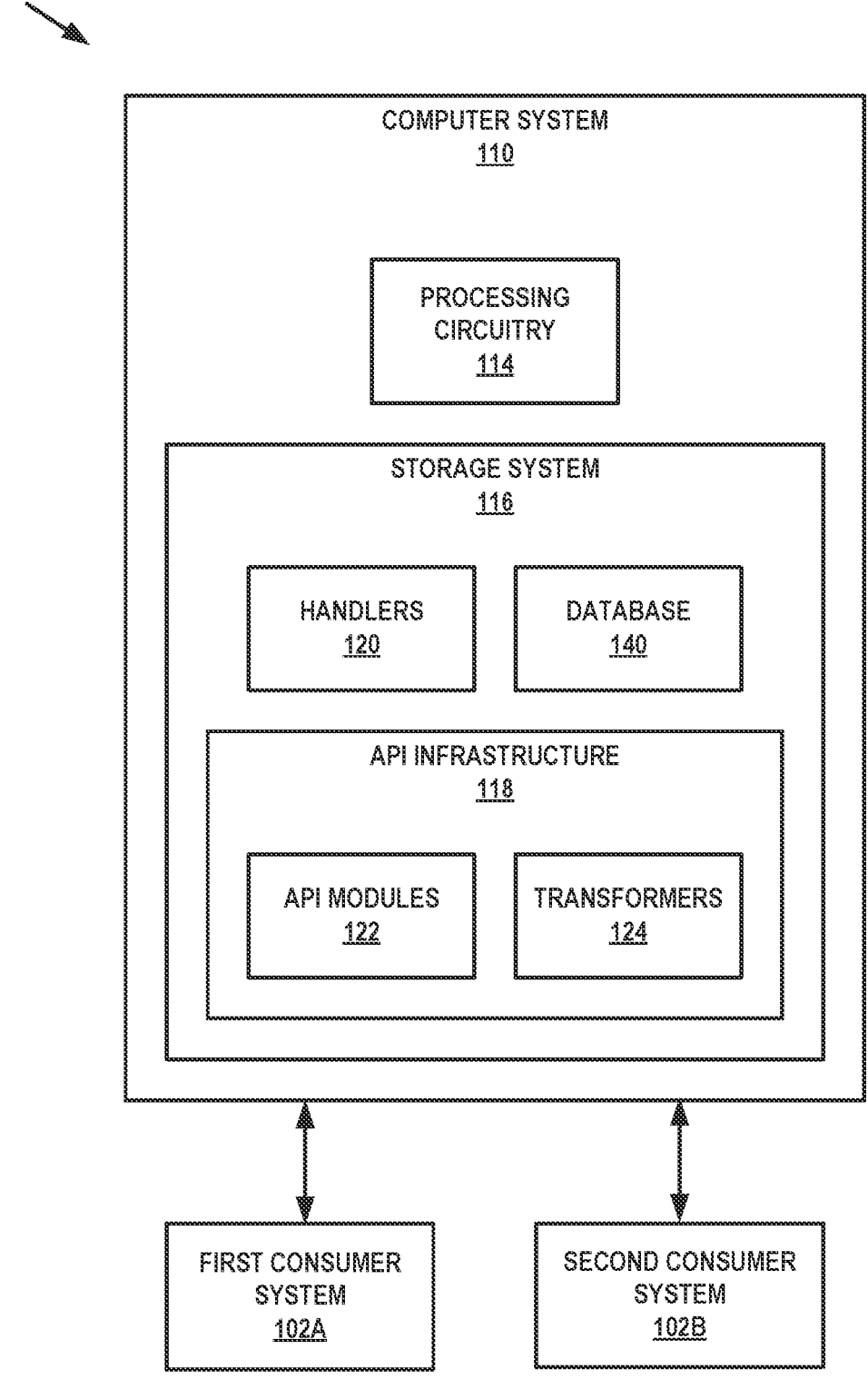
FIG. 1 is a block diagram illustrating an example computer system, in accordance with one or more techniques of this disclosure.

FIG. 1 is a block diagram illustrating an example system 100 in accordance with one or more techniques of this disclosure. The system 100 includes a first consumer system 102A and a second consumer system 102B (collectively "consumer systems 102"), and a computer system 110. Consumer systems 102 and computer system 110 may include servers, personal computers, mainframe computers, supercomputers, workstation computers, mobile computing devices, intermediate network devices, or other types of computing device. Computer system 110 may be configured to communicate with consumer systems 102 via one or more communication interfaces. The communication interfaces may be used to transfer API requests from consumer systems 102 to computer system 110. The communication interfaces may be used to transfer API responses from computer system 110 to consumer systems 102.

Computer system 110 may include processing circuitry 114 and a storage system 116. Processing circuitry 114 may comprise circuitry configured to perform processing functions. For instance, processing circuitry 114 may include one or more microprocessors, application-specific integrated circuits (ASICs), field-programmable gate arrays (FPGAs), or other types of processing circuitry. Processing circuitry 114 may read and may execute instructions stored on storage system 116. Processing circuitry 114 may include fixed-function processors and/or programmable processors. Processing circuitry 114 may be included in a single device or distributed among multiple devices.

Storage system 116 may include one or more non-transitory computer readable media, such as random access memory (RAM), read only memory (ROM), volatile memory, non-volatile memory, or other forms of hardware devices that may be used to store programming instructions or data accessible by processing circuitry 114. The media of storage system 116 may be included in a single device or distributed among multiple devices.

Computer system 110 may include computer integrated communication interfaces between components of computer system 110. In some examples, computer integrated communication interfaces may include bus interconnections between at least two of processing circuitry 114, memory storage device 116, and database 140. The computer integrated communication interfaces may be configured to transfer, route, transmit, or communicate data, instructions, or timing signals between components to execute API requests and API responses. In some examples, components of computer system 110 may communicate via a network, such as the Internet or a local area network.

Storage system 116 stores instructions associated with an API infrastructure 118 and one or more handlers 120. API infrastructure 118 may include instructions associated with API modules 122 and transformers 124. Execution of the instructions associated with API infrastructure 118, handlers 120, API modules 122, and transformers 124 by processing circuitry 114 may configure computer system 110 to perform the functionality ascribed to API infrastructure 118, handlers 120, API modules 122, and transformers 124. In other examples, one or more of API infrastructure 118, handlers 120, API modules 122, and transformers 124 may be implemented at least in part in software implemented by one or more processors. Additionally, storage system 116 may include a database 140. Database 140 may represent one or more databases implemented on one or more pieces of hardware, such as a mainframe, or other memory storage hardware.

In some examples, API infrastructure 118 may receive API requests from at least one of consumer systems 102. API infrastructure 118 may also send API responses to at least one of consumer systems 102. Consumer systems 102 may send API requests to and receive API responses from one or more other computer systems (e.g., computer system 110) via a communications network, such as a local area network or the Internet. In some examples, consumer systems 102 may include wireless transmitters and receivers that enable consumer systems 102 to communicate wirelessly with other computing devices. In some examples, consumer systems 102 include communication units to facilitate communication with other computer systems. Examples of communication units may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc.

Handlers 120 may handle (e.g., fulfill, execute, perform, etc.) API requests. In some examples, handlers 120 may handle specific API requests by interfacing with database 140 to retrieve data requested by the API requests. When interfacing with database 140, handlers 120 may pull or request data from database 140 based on the data in the API request. In response to API requests, API infrastructure 118 may send corresponding API responses to at least one of consumer systems 102.

API modules 122 may correspond to different versions of an API. Different versions of the API may have different functions, different parameter sets, different formatting requirements of API requests and responses, and so on. In general, individual consumer systems are configured to format API requests according to a specific API version and receive API responses according to the specific API version. Thus, when API infrastructure 118 receives an API request formatted according to a specific API version, the API module for the specific API version may provide the API request to an appropriate one of handlers 120 configured to execute the API request. Likewise, the API module for the specific API version may provide a corresponding API response to a consumer system that sent the API request.

In some examples, computing system 100 includes a front-end computing system and a back-end computing system. In such examples, the front-end computing system may receive API requests from consumer systems 102 and send API responses to consumer systems 102. The back-end computing system may be responsible for executing the API requests and generating the API responses. For instance, the front-end computing system may implement API infrastructure 118, and the back-end computing system may implement handlers 120. In other examples, system 100 may include more, fewer, or different components.

In some examples, computer system 110 may implement a variety of handlers that correspond to different API versions. For instance, a first handler may handle API requests for a first API version, a second handler may handle API requests for a second API version, and so on. As described in this disclosure, maintaining multiple handlers 120 for different API versions may be complicated and expensive. For instance, experienced software engineers may be needed to fix problems in multiple handlers. Moreover, the multiple handlers may consume extra computations and storage resources, diminishing performance of computer system 110.

According to techniques of this disclosure, computer system 110 may use transformers 124 to transform API requests and API responses between API versions. For example, a step-up request transformer may transform an API request from a format compatible with a first API version to a format compatible with a second API version. The first API may be a less or more current version than the second API version. A step-down response transformer may transform an API response from a format compatible with the second API version to a format compatible with the first API version. A goal of the API step-up request transformers is to transform API requests into a format that can be handled by a single handler or a relatively small number of handlers. This may avoid the need to maintain a large number of handlers. Likewise, a goal of the API step-down response transformers is to transform API responses into a format that can be used by the consumer systems 102 that originally sent the corresponding API requests.

In situations where computer system 110 supports three or more API versions, handler 120 may be configured to handle only API requests formatted for a most-recent version of the API. In this situation, it may be advantageous for transformers 124 to transform API requests to a format of a next API version multiple times until the API request is in the format for the most-recent version of the API instead of attempting to directly transform API requests to the format of the most-recent version of the API. Likewise, it may be advantageous for transformers 124 to transform API responses one API version at a time until the API response is in a format suitable for transmission to a consumer system that sent the corresponding API request. This architecture may avoid the need to rewrite transformers 124 each time a new version of the API is generated. Rather, new transformers may be written that transform API requests and API responses from the previous version of the API to the new version of the API.

Thus, in accordance with techniques of this disclosure, a first step-up request transformer of transformers 124 may be configured to receive a first API request as an input. The first API request may be compatible with a first version of an API. The first step-up request transformer may transform the first API request into a second API request. The second API request may be an output from the first step-up request transformer.

In some examples, a second step-up request transformer of transformers 124 may transform the second API request into a third API request. In some examples, the third API version may be a more or less current version than the second API version. The third API request may have a format that is compatible with a format of a third API version and may be an input to a handler (e.g., one of handlers 120). In some examples, the handler may retrieve data requested by the first API request from database 140. In some examples, the handler sends the data in a payload of a first API response to a first step-down response transformer, the first API response having a format compatible with a format of a third version of the API. The handler may output an API response including the retrieved data from database 140. In some examples, received data may be included as a payload of the API response.

In some examples, the first step-down response transformer transforms the first API response into a second API response, the second API response being compatible with the second version of the API and an input format of a second step-down response transformer. Transforming the first API response into the second API response may be performed with a passive transform or an active transform step. A passive transform step is a transform that changes the format of the first API response to align with a format compatible with the second version of the API without additional information. An active transform step performs the same transform technique but may acquire additional information or perform additional actions.

The second step-down transformer may transform the second API response into a third API response, the third API response being compatible with the first version of the API. Transforming the second API response into the third API response may use active transform steps. In some examples, an API module (e.g., API module 122) associated with the first version of the API may output the third API response to first consumer system 102A.

Figure 2:
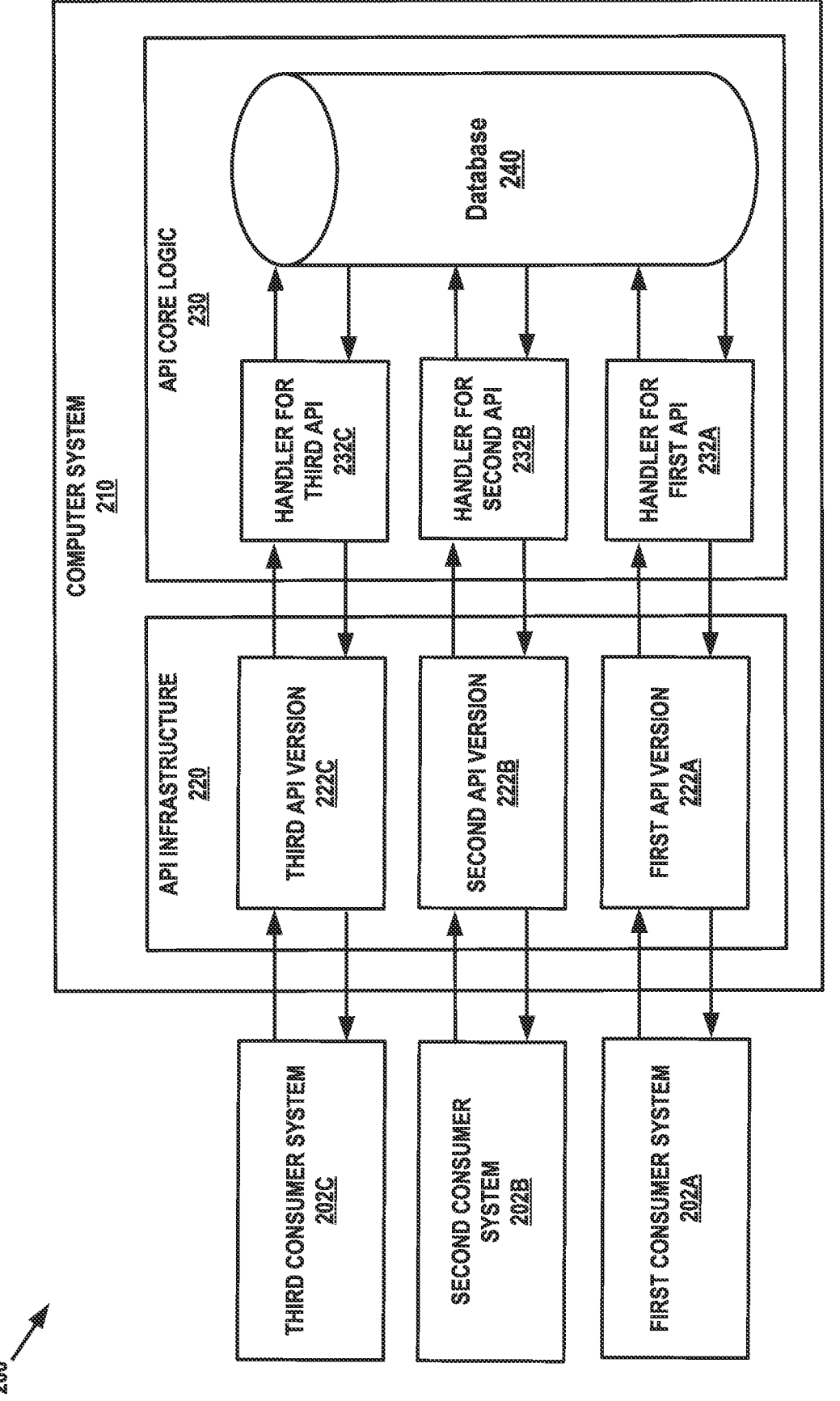
FIG. 2 is a block diagram illustrating an example computer system to support multiple versions of an API, in accordance with one or more techniques of this disclosure.

FIG. 2 is a block diagram illustrating an example computer system 200 to support multiple versions of an API, in accordance with one or more techniques of this disclosure. In some examples, system 200 may include computer system 110 of FIG. 1 instead of computer system 210. Computer system 210 may implement software including API infrastructure 220 and API core logic 230. In some examples, API infrastructure 220 and API core logic 230 may be implemented with processing circuitry 114, memory storage device 116, and database 140 of FIG. 1 (not illustrated in FIG. 2). Although API infrastructure 220 and API core logic 230 are illustrated as being implemented on the same computer system 210, in other examples, API infrastructure 220 and API core logic 230 may be implemented on separate computer systems.

In some examples, multiple API versions may be supported or maintained by API infrastructure 220. Each API version may have specific nuances within its model, service logic, or backend. Assuming that the updated versions are substantially different from their predecessor(s), each API version could require a separate branch of code, data-source, independent service infrastructure, and associated pipeline, not to mention a myriad of other integrations and dependencies. With this often-complex setup, teams working with APIs may be required to constantly re-evaluate individual API versions to fix bugs with each new update. In such examples, a first API version 222A, a second API version 222B, and a third API version 222C (collectively "API versions 222") may be maintained in concurrence on API infrastructure 220. API version 222A may be implemented on the same hardware (e.g., processing circuitry 114) or on separate hardware from the hardware used to implement API versions 222B and/or API version 222C.

API version 222A may be configured to communicate with a first consumer system 202A. Second API version 222B and third API version 222C may be configured to communicate with a second consumer system 202B and third consumer system 202C, respectively. This disclosure may refer to consumer systems 202A, 202B, and 202C collectively as "consumer systems 202." Communication may occur over one or more communication interfaces between API infrastructure 220 and consumer systems 202.

The communication interfaces may include independent communication paths linking individual consumer systems 202 with corresponding API versions 222 operated by API infrastructure 220. In some examples, each independent communication path between a consumer system and an API version may be bi-directional, allowing communication to travel from the consumer system to an API version and from the API version to the consumer system. In some examples, any consumer system of consumer systems 202 may be configured to communicate bi-directionally with API infrastructure 220.

In some examples, bi-direction communication may include sending API requests from one of consumer systems 202 to API infrastructure 220 and sending API responses from API infrastructure 220 to one of consumer systems 202. In some examples, first consumer system 202A may send API requests to first API version 222A. In some examples, first API version 222A may be configured to send API responses and receive API requests from a variety of consumer systems (not illustrated in FIG. 2). Second consumer system 202B and third consumer system 202C may similarly be configured to communicate with second API version 222B and third API version 222C respectively. Similarly, second API version 222B and third API version 222C may each be configured to communicate with various consumer systems.

API core logic 230 may implement a plurality of handlers 232A, 232B, and 232C (collectively, "handlers 232"). Each of handlers 232 may be configured to execute API requests received from a corresponding API version. In some examples, executing an API request involves reading information from database 240 or storing data on database 240.

In some examples, each of handlers 232 may be configured to receive API requests compatible with a unique version of the API. Each of handlers 232 may be configured to output API responses compatible with the unique version of the API. In some examples, the unique version compatible with the requests of the handler may be different from the unique version compatible with the responses of the handler.

Implementing a plurality of handlers allows a variety of versions of an API to be maintained, however it may require more resources than would be required with a single handler. Accordingly, in some examples, all API requests are transformed into a common format compatible with the single handler. API responses may be sent from the handler. The API responses sent by the handler may have a common format. The common formatted responses may be transformed into various formats compatible with various API versions.

Figure 3:
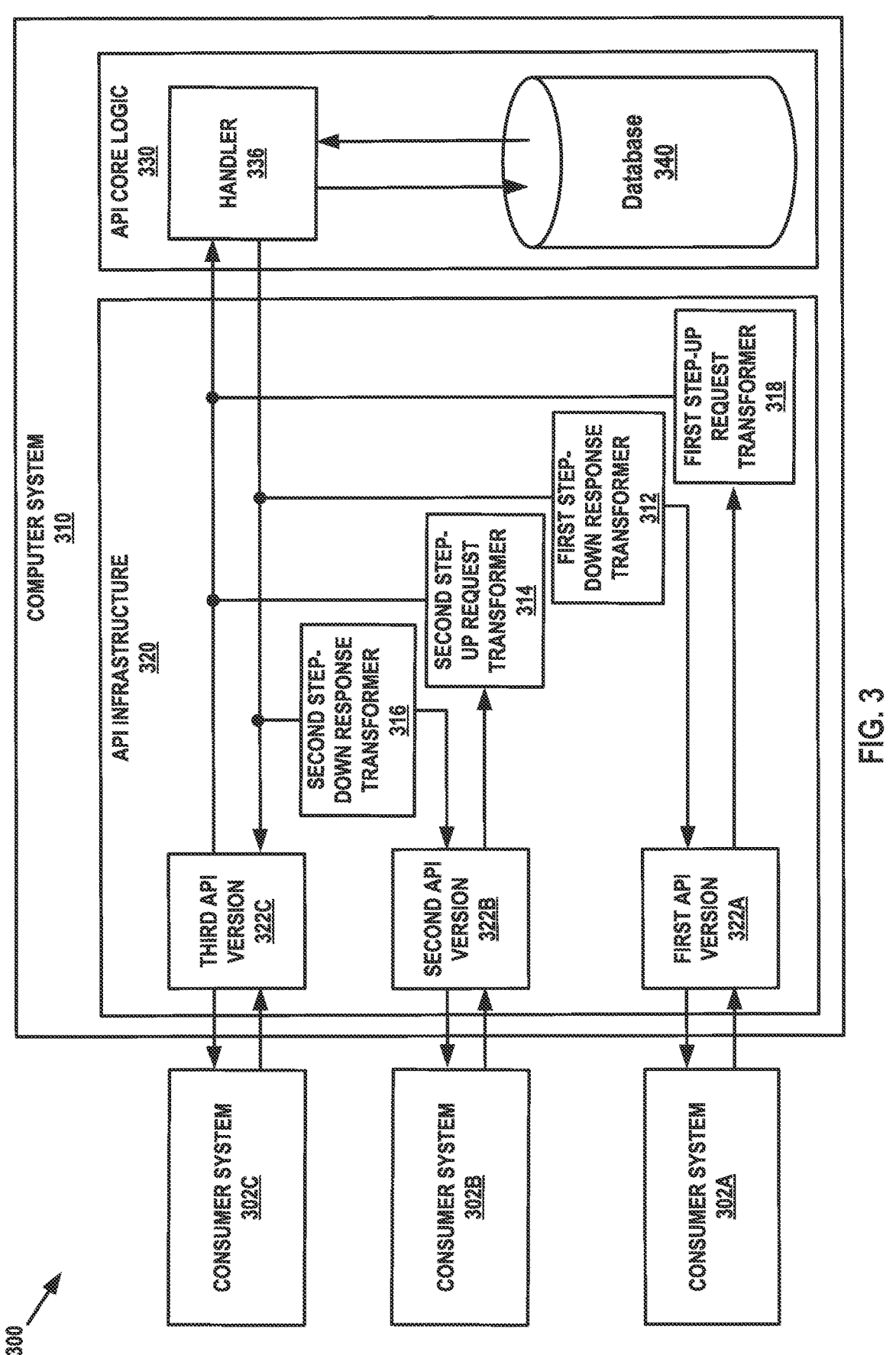
FIG. 3 is a block diagram illustrating an example computer system to support multiple versions of an API with a single handler, in accordance with one or more techniques of this disclosure.

FIG. 3 is a block diagram illustrating an example computer system 300 to support multiple versions of an API with a single handler 336, in accordance with one or more techniques of this disclosure. In some examples, single handler 336 may operate within API core logic 330. All API requests may be transformed into API requests having a common format compatible with handler 336. In some examples, the common format may be the API request format compatible with a particular version of an API. In some examples, handler 336 may be configured to receive API requests having a common API request format, execute the API requests (e.g., retrieve associated data from database 340), and send API responses having a common API response format. In some examples, a handler for third API version 322C may be used as a handler for second API version 322B and as a handler for third API version 322C.

In some examples, API requests may be transformed with a step-up request transformer and API responses may be transformed with a step-down response transformer. The step-up request transformer may transform a first API request having a format compatible with a legacy version of an API into a second API request having a format compatible with a version of the API that is more current (e.g., released at a later date). The step-down response transformer may transform a first API response having a format compatible with a version of the API into a second API response having a format compatible with an API version that is less current. In some examples, the format of the second API request and the format of the first API response may be compatible with the most-current version of the API. API requests and API responses with formats compatible with legacy API versions, may be made compatible with the most current version of the API through the use of step-up request transforms and step-down response transforms.

In some examples, a unique step-up request transformer and unique step-down response transformer may be configured to interface between every supported legacy version of the API and the most current version of the API. Using a unique step-up request transformer and a unique step-down response transformer to interface with each supported legacy version of the API allows the single handler to be implemented. In some examples, a first step-up request transformer 318 may be configured to transform API requests received by a first API version 322A. First step-up request transformer 318 may transform the first request into a second request having a format compatible with a third API version 322C. In some examples, third API version 322C may be compatible with API requests having a format that is also compatible with handler 336. Handler 336 may work in conjunction with API core logic 330 to execute API requests (e.g., retrieve data from database 340 or perform a computing task). Handler 336 may work with API core logic 330 to send API responses, having a format, compatible with third API version 322C.

In some examples, consumer system 302C may send API requests having a format compatible with a third API version 322C. Similarly, consumer system 302B may send API requests having a format compatible with a second API version 322B and consumer system 302A may send API requests having a format compatible with a first API version 322A. In some examples, consumer system 302C may represent multiple independent consumers, all running multiple independent systems compatible with third API version 322C. Similarly, consumer system 302B, may represent multiple independent consumers all running multiple independent systems compatible with second API version 322A, and consumer system 302A may represent multiple independent consumers all running multiple independent systems compatible with second API version 322A.

In some examples, API requests received by API infrastructure 320 from any of consumer systems 302 may be transformed by a corresponding step-up transformer into an API request with a format compatible with handler 336. In some examples, API requests sent by consumer system 302A may be transformed by first step-up request transformer 318 into API requests with a format equivalent to the format of API requests compatible with third API version 322C. In some examples, API requests received by API infrastructure 320 from consumer system 302B may be transformed by second step-up request transformer 314 into API requests having a common format compatible with third API version 322C. In some examples, API requests received by API infrastructure 320 from consumer system 302C may have a common format already compatible with third API version 326. Handler 336 may be configured to receive transformed API requests from any first step-up request transformer 318, second step-up request transformer 314, or from third API version 306.

Handler 336 may be configured to output API responses having a common API response format. Third API version 322C may send API responses intended for consumer system 302C directly to consumer system 302C without the API responses being transformed. API infrastructure 320 may send API responses intended for consumer system 302B to a second step-down response transformer 316 to be transformed from an API response compatible with third API version 326 to an API response compatible with second API version 322B. Second API version 322B may send an output from second step-down response transformer 316 directly to consumer system 302B. API infrastructure 320 may send API responses intended for consumer system 302A to a first step-down response transformer 312 to be transformed from an API response compatible with third API version 322C to a response compatible with first API version 322A. First API version 322A may send an output from first step-down response transformer 312 directly to consumer system 302A.

Figure 4:
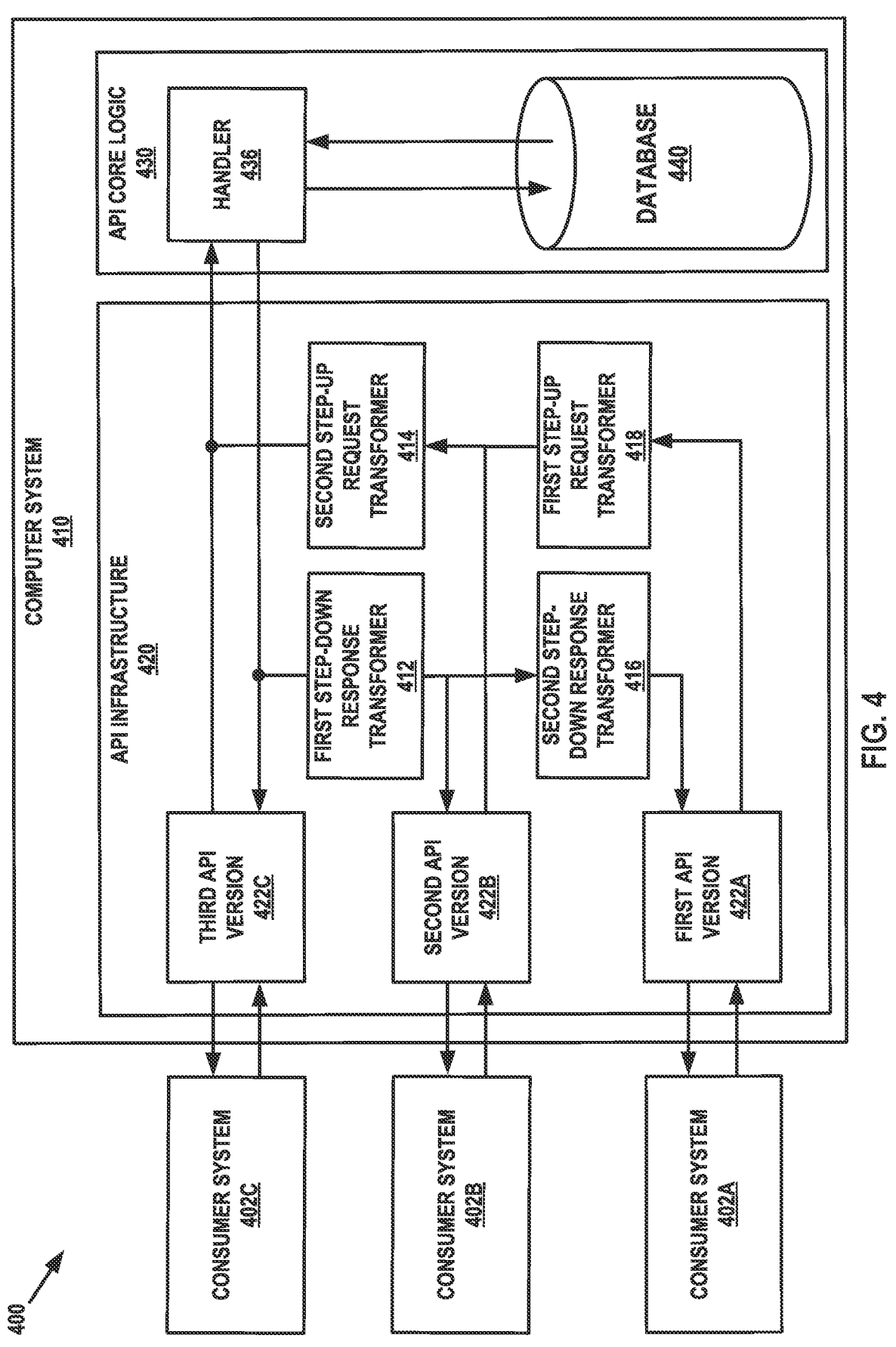
FIG. 4 is a block diagram illustrating an example computer system to support multiple versions of an API using interconnected transformers and a single handler, in accordance with one or more techniques of this disclosure.

FIG. 4 is a block diagram illustrating an example system 400 using a computer system 410 to support multiple versions of an API using interconnected transforms and a single handler, in accordance with one or more techniques of this disclosure. Using the configuration of requests transforms and step-down response transform as illustrated in FIG. 3 may support a single handler but may require significant resources to maintain. Changes to handler 336 of FIG. 3 may trigger alterations to all step-up request transforms and all step-down response transforms. The architecture implemented using step-up request transformers and step-down response transformers on API infrastructure 420 of FIG. 4 may limit the need for alterations to all transforms in the presence of handler updates.

In some examples, API requests may be received by API infrastructure 420 from consumer system 402A using a first API version 422A, a consumer system 402B using a second API version 422B, and a consumer system 402C using a third API version 422C. Consumer systems 402A, 402B, and 402C may be collectively referred to as "consumer systems 402"). An architecture of step-up request transformers and step-down response transformers in conjunction with a single handler, for example a handler 436 for third API version 422C, as shown in FIG. 4, may provide interface between the consumer systems 402 and a database 440.

In some examples, API requests sent from consumer system 402A may be received by API infrastructure 420 and routed to a first step-up request transformer 418. In some examples, a first API request received by API infrastructure 420 may be routed to first step-up request transformer 418. First step-up request transformer 418 may be configured to transform the first API request into a second API request that is compatible with a second API version 422B. Second step-up request transformer 414 may transform the second API request into a third API request. In some examples, the second step-up request transformer may transform a plurality of API requests having a formation compatible with a second API version 422B into a second plurality of API request having a format compatible with the most-current API version (e.g., third API version 422C). The step-up request transformer may send the second plurality of API requests formatted to be compatible with a most-current API version, to a handler. The third API request may be compatible with third API version 422C. API requests compatible with third API version 422C may have an API request format suitable for use by handler 436. In some examples, all API requests may be transformed into the common API request format compatible with third API version 422C. The single handler (e.g., handler 436) may receive API requests having the common API request format and execute the API requests (e.g., by retrieving data from database 440, performing a computation, etc.). The handler may retrieve data requested by an API request from a database, and send, by the handler, the data in an API response to a step-down response transformer.

In some examples, handler 436 may send API responses having a common API response format compatible with third API version 422C. The responses sent by handler 436 may be API responses corresponding to the received API requests and may be intended for a corresponding consumer system of consumer systems 402. In some examples, API requests sent by a sending consumer system of consumer systems 402 may trigger handler for third API 436 to generate a response intended for the sending consumer system.

In some examples, API responses sent from handler 436 may be intended for consumer system 402A. For example, a first API response sent by handler 436 may be compatible with third API version 422C. The first step-down response transformer may receive a plurality of AI responses formatted to be compatible with a most-current API version (e.g., third API version 422C) from the handler.

A first step-down response transformer 412 may transform the first API response into a second API response compatible with second API version 422B. A second step-down response transformer 416 may transform the second API response into a third API response compatible with first API version 422. First API version 422A may send the third API response to consumer system 402A.

Similarly, API responses sent from handler 436 may be intended for consumer system 402B. For instance, a first API response sent by handler 436 may be compatible with third API version 422C. First step-down response transformer 412 may transform the first API response into a second API response compatible with second API version 422B. Second API version 422B may send the second API response to consumer system 402B. API responses sent from handler 426 intended for consumer system 402C may be send by third API version 422C to consumer system 402C without transformation.

As an example of FIG. 4, consider a public-facing food ordering API that has evolved into three versions over time. All three versions are live and available to customers.

| API Version | Notes | Step Up | Step Down |
|---|---|---|---|
| Version 1 (/order/v1) | Takes a simple order, defaulting to a sandwich and medium size drink and fries. | Delegates request to V2 by hardcoding V2 request details to match V1 defaults. | Simplifies V2 response and consolidates delivery window to V1 specifications. |
| Version 2 (/order/v2) | Improves V1 options for customers with respect to types and sizes of options. | Delegates request to V3 by adding a default pickup time of "now". | No changes in V3 to V2 response (identity transformation). |
| Version 3 (/order/v3) | Extends V2 by allowing for specific order pickup date and time. | Handles request. | Generates response. |

An accordance with API version 1, Restaurant A implements a simple REST API service consumer that allows customers to place simple food orders:

| Request | Response |
|---|---|
| { "sandwich": "Chicken", "side": "Onion Rings", | { "order-number": 1234, |

-continued

| "drink": "Pepsi" } | "pickup-time-window":"12PM - 2PM" } |

| Request V1 –> V2 Transform (JQ) | Response V2 - V1 Transform (JQ) |
|---|---|
| {entree: {type: "sandwich", protein:sandwich, bread: "white"}, side: {type:.side, size: "medium"}, drink: {type:.drink, size: "medium"}} | {order-number:.order-number, pickup-date:.pickup-date-window} |

Restaurant B wants to allow its customers to order different sizes of fries. The API provider creates version 2.0 of the REST API (providing an additional handler with new code) to lets Restaurant B's customers order this way. Restaurant A, who still wants to deploy version 1.0, is not affected by this change.

| Request | Response |
|---|---|
| { "entree": { "type":"sandwich", "protein":"Chicken", "bread": "wheat" }, "side": { "type":"fries", "size": "medium" }, "drink": { "type":"pepsi", "size": "medium" } } | { "order-number": 1234, "pickup-date":"Jan 01 2022", "pickup-time-window": "12PM to 2PM" } |

| Request V2 –> V3 Transform (JQ) | Response V3 - V2 Transform (JQ) |
|---|---|
| {entree: {type: "sandwich", protein:sandwich, bread: "white"}, side: {type:.side, size: "medium"}, drink: {type:.drink, size: | . |

-continued

"medium"}, order-date: "TODAY", order-pickup-time: "IN-ONE-HOUR"}

Restaurant C wants to allow its customers to select a protein and bread choice as well. The API provider creates version 3.0 of the REST API (providing an additional handler with new code) to lets Restaurant C's customers order this way. Restaurant A, who still wants to deploy version 1.0, is not affected by this change. Restaurant B, who still wants to deploy version 2.0, is not affected by this change.

| Request | Response |
|---|---|
| {<br>  "entree": {<br>    "type":"sandwich",<br>    "protein":"Chicken",<br><br>    "bread": "wheat"<br>  },<br>  "Side": {<br>    "type":"fries",<br>    "size": "medium"<br>  },<br>  "Drink": {<br>    "type":"pepsi",<br>    "size": "medium"<br>  },<br>  "order-date": "Jan 02 2022",<br>  "order-pickup-time": "2PM"<br>} | {<br>  "order-Number": 1234,<br>  "pickup-date":"Jan 01 2022",<br>  "pickup-time-window":<br>  "12PM to 2PM"<br>} |

In some examples, the computer system may be configured to receive by an initial step-up transformer the first API request from a first consumer system and transform sequentially, by a plurality of step-up transformers, the first API request into the first API request (not illustrated in FIG. 4). The computer system may be configured to output by a last step-up transformer of the plurality of step-up transformers, the first API request to the computer system.

In some examples, the computer system may be configured to receive by an initial step-down transformer the third API response from the second step-down transformer and transforming sequentially, by a plurality of step-down transformers, the third API response into a final API response. The computer system may be configured to output by a last step-down transformer of the plurality of step-down transformers, the third API response to the first consumer system.

In some examples, the plurality of step-up transformers may be configured to receive API requests from any of consumer systems 402. The output of the plurality of transforms may have a format compatible with a version of any of the API versions 422.

Figure 5:
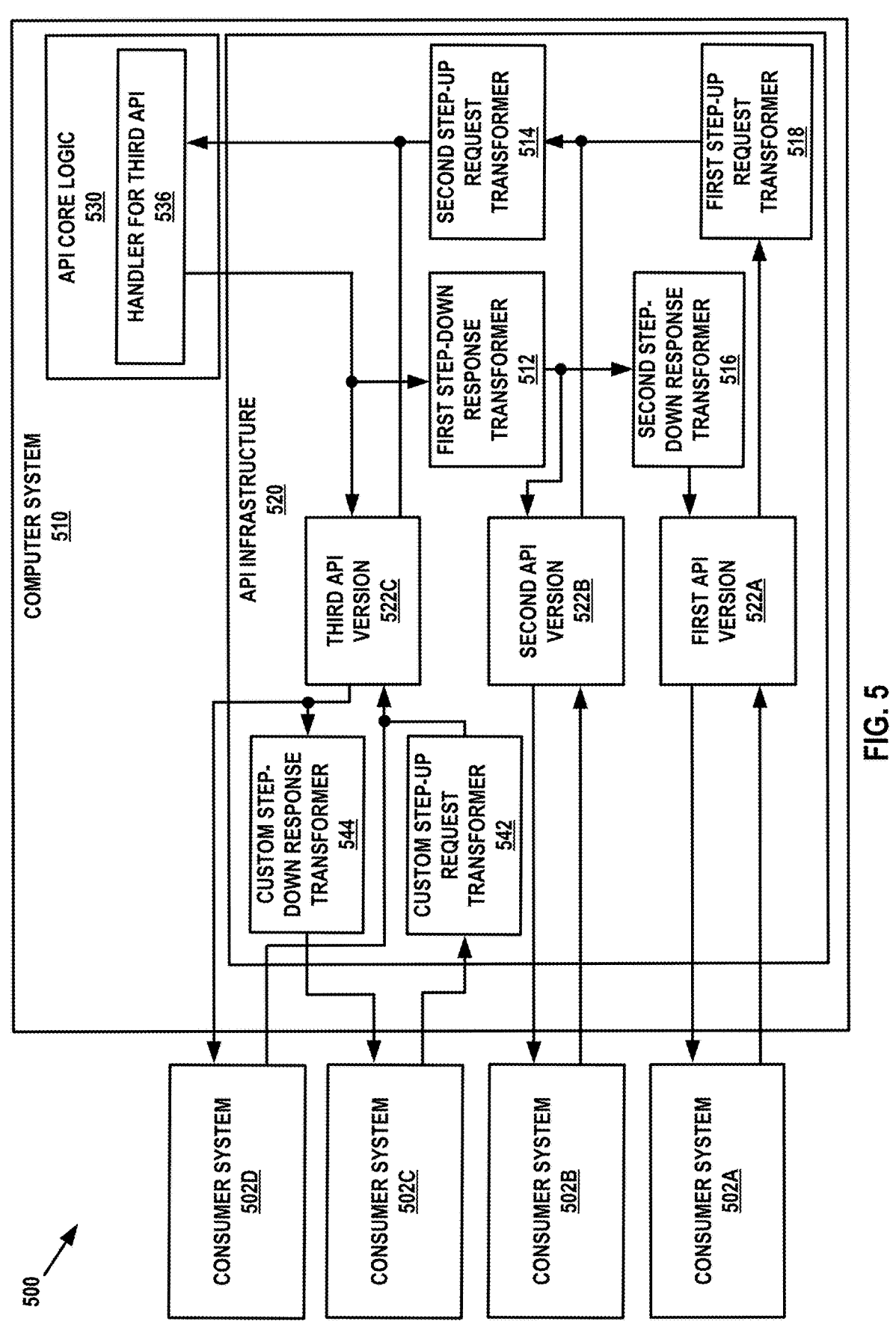
FIG. 5 is a block diagram illustrating an example computer system to support custom versions of an API using custom transformers, in accordance with one or more techniques of this disclosure.

FIG. 5 a block diagram illustrating an example of system using a computer system 510 to support custom versions of an API using custom transforms, in accordance with one or more techniques of this disclosure. Using the configuration of step-up request transformers and step-down response transformers as illustrated in FIG. 4 may support many consumer systems running various versions of the API. However, in some examples, some consumer systems may have restricted access to features of a released API. In some examples, some consumers may desire to use a version of an API but have access to additional features. To support access to additional or limit features of a released version of an API custom transformer may be integrated into an API infrastructure 520 of computer system 510.

In some examples, custom transformers may be used to restrict access or add features to a version of an API for a limited number of consumer systems. A custom step-up request transformer may transform a custom API request received from a consumer system, into an API request. The API request may have a format compatible with a generic or released version of an API. A custom step-down response transformer may receive an API response, transforming, by the first custom step-down response transformer, the API response into a custom API response compatible with a customized API modification. The API custom step-down response transformer may output the first custom API response.

In some examples, the first custom step-up request transformer may include a plurality of custom step-up request transformers implemented by API infrastructure 520. Each custom step-up request transformer of the plurality of custom step-up request transformers may be configured to receive a unique API request compatible with a corresponding custom modification of a version of the API (not illustrated). In some examples, a custom modification used by consumer system 502C may be supported by custom step-up request transformer 542. In some examples, one or more custom step-up request transformers may be used to transform an API request received by another consumer system into an API request having a format compatible with an input to custom step-up request transformer 542. Additional custom modifications may be supported by additional custom step-up request transformers between consumers with different custom modifications.

In some examples, the first custom step-down response transformer may include a plurality of custom step-down response transformers implemented by API infrastructure 520. Each custom step-down response transformer of the plurality of custom step-down response transformers may be configured to receive an API response and transform the API response into a unique API custom response compatible with a corresponding custom modification of a version of the API (not illustrated). The customer modification for consumer system 502C may also be supported by custom step-down response transformer 544. In some examples, one or more custom step-down request transformers may be used to transform a custom API response output by custom step-down response transformer 544 into another custom API response having a unique format compatible the other consumer. Additional custom modifications may be supported by additional custom step-down response transformers between consumers with different custom modifications.

In some examples, API infrastructure 520 of computer system 510 may concurrently support consumer systems using a third API version 522C (e.g., consumer system 502D) and consumer systems (e.g., consumer system 502C) using a custom third API version 506. Consumer system 502D may send API requests compatible with third API version 522C to API infrastructure 520. API infrastructure 520 may forward the API requests to a handler 536 compatible with third API version 522C. Handler 536 may be implemented on API core logic 530. Concurrently, consumer system 502C (which uses the custom third API version) may send a custom API request, not compatible with third API version 522C, to API infrastructure 520. API infrastructure 520 may use a custom step-up request transformer 542 to transform the custom API request into a first API request compatible with third API version 522C.

Handler 536 may receive API requests originating from consumer system using third API version 508 directly or as the output from custom request transformer 544. Handler 536 may be configured to execute API requests, e.g., by retrieving data from a database corresponding to the received API request (not illustrated in FIG. 5).

API infrastructure 520 may also simultaneously support multiple consumer systems that are configured to use versions of the API in addition to third API version 522C and the custom third API version. In some examples, API requests and API responses for a first API version 522A may be made compatible with a second API version 522B using a first step-up request transformer 518 and a second step-down response transformer 516. In some examples, API requests and API responses for second API version 522B may be made compatible with third API version 522C using a second step-up request transformer 514 and a first step-down response transformer 512.

In some examples, custom step-up request transforms and custom step-down response transforms may be used on any supported API version to support additional features of limit some features for some consumer system. In some examples, custom step-up request transformers and custom step-down response transformers may be used with first API version 522 and/or second API version 524.

In some examples, custom step-up request transformer 542 may be one of a plurality of custom step-up request transformers, implemented by the computer system, wherein each custom step-up request transformer of the plurality of custom step-up request transformers is configured to receive a unique API request compatible with a corresponding custom modification of a version of an API (not illustrated). Similarly, custom step-down response transformer 544 may be one of a plurality of custom step-down response transformers, implemented by the computer system, wherein each custom step-down response transformer of the plurality of custom step-down response transformers is configured to receive an API response and transform the API response into a unique API custom response compatible with a corresponding custom modification of a version of an API. Each unique API custom response has a unique format compatible with a custom API version having a custom modification.

In some examples, rather than the step-up request transformers and step-down response transformers being implemented at computer system 510, the request and step-down response transformers may be implemented in libraries that execute on consumer systems 502. Thus, an API provider may provide a software library that all consumers of the API may use when the consumer systems are making requests to and receiving responses from to the API. In some examples, version-based transformers are performed in a client software development kit (SDK). This implementing the transformers in the SDK may alleviate the need for dedicated service-side infrastructure to host transformation layers and translates compute to the client. In some examples, a hybrid technique may be used in which the transformers are split between the server and the client. This may allow for various compute and performance optimizations.

FIG. 6 is a flowchart illustrating an example process for maintaining multiple versions of an API using a single handler, in accordance with one or more techniques of this disclosure. In some examples, the techniques 600 of FIG. 6 may be performed by a computer system, such as anyone of computer systems 110, 210, 310, 410, or 510.

In accordance with one or more techniques of this disclosure, a computer system configured to receive a first API request compatible with a first version of an API (602). The computer system may include an API infrastructure (e.g., 220, 320, 420, or 520) to receive API requests via one or more communication interfaces.

A first step-up request transformer of the computer system may transform the first API request into a second API request, the second API request being compatible with a second version of the API (604). The first API request may be an API request received by any version of an API of a variety of versions of an API excluding the most current version of the API. The second version of the API may be a more recently developed version than the first version of the API. The second version of the API may be any version of an API of the variety of versions of an API excluding the most current version of the API.

A second step-up request transformer of the computer system may transform the second API request into a third API request, the third API request being compatible with a third version of the API (606). The third API request may be the most current version of the API. The third version of the API may be a more recently developed version than the second version of the API or the first version of the API. In some examples, the API request may be transformed by one or more additional step-up request transformers corresponding to additional API versions until the API request is in a form suitable for execution by a handler of the computer system. For instance The handler of the computer system may execute the third API request. For instance, the handler may retrieve data requested by the first API request from a database. The handler may send the data in a first API response to a first step-down response transform. The first API response may be compatible with the same version of the API as the API request provided to the handler. For instance, the first API response may be compatible with the third version of the API.

The first step-down response transformer may transform the first API response into a second API response, the second API response being compatible with the second version of the API and an input format of a second step-down response transform (608).

The second step-down response transformer may transform the second API response into a third API response, the third API response being compatible with the first version of the API (610). The computer system may output the third API response (612). In other examples, the computer system may use one or more additional step-down response transformers to transform the API response into a format compatible with an API version used by the consumer system that initially sent the API request.

The following is a non-limiting list of examples that are in accordance with one or more techniques of this disclosure.

Example 1. A computer-implemented method comprising: receiving, by a computer system, a first application programming interface (API) request compatible with a first version of an API; transforming, by a first step-up request transformer of the computer system, the first API request into a second API request, the second API request being compatible with a second version of the API and being an input to a second step-up request transformer of the computer system; transforming, by the second step-up request transformer, the second API request into a third API request, the third API request being compatible with a third version of the API and being an input to a handler; transforming, by a first step-down response transformer of the computer system, a first API response from the handler into a second API response, the first API response being compatible with the third version of the API, the second API response being compatible with the second version of the API and being an input to a second step-down response transformer of the computer system; transforming, by the second step-down response transformer, the second API response into a third API response, the third API response being compatible with the first version of the API; outputting, by the computer system, the third API response.

Example 2. The computer-implemented method of example 1, wherein the outputting comprises: receiving, by a first custom step-down response transformer of the computer system, the third API response; transforming, by the first custom step-down response transformer, the third API response into a first custom API response compatible with a customized API modification; outputting, by the first custom step-down response transformer, the first custom API response.

Example 3. The computer-implemented method of example 2, wherein the first custom step-down response transformer is one of a plurality of custom step-down response transformers implemented by the computer system, wherein each custom step-down response transformer of the plurality of custom step-down response transformers is configured to receive an API response and transform the API response into a unique API custom response compatible with a corresponding custom modification of a version of the API.

Example 4. The computer-implemented example of any of examples 1-3, wherein the receiving comprises: transforming, by a first custom step-up request transformer of the computer system, a custom API request received from a first consumer system, into the first API request.

Example 5. The computer-implemented method of example 4, wherein the first custom step-up request transformer is one of a plurality of custom step-up request transformers implemented by the computer system, wherein each custom step-up request transformer of the plurality of custom step-up request transformers is configured to receive a unique API request compatible with a corresponding custom modification of a version of the API.

Example 6. The computer-implemented method of any of examples 1-5, wherein the receiving comprises: receiving, by an initial step-up transformer of the computer system, an initial AI request from a first consumer system, the method further comprising: transforming sequentially, by a plurality of step-up transformers of the computer system, the initial API request into the first API request; and outputting, by a last step-up transformer of the plurality of step-up transformers, the first API request.

Example 7. The computer-implemented method of any of examples 1-6, wherein the outputting comprises: receiving, by an initial step-down transformer of the computer system, the third API response from the second step-down transformer; transforming sequentially, by a plurality of step-down transformers, the third API response into a final API response; outputting, by a last step-down transformer of the plurality of step-down transformers, the final API response to the first consumer system.

Example 8. A computer system comprising: one or more processors configured to: receive a first application programming interface (API) request compatible with a first version of an API; transform, via a first step-up request transformer, the first API request into a second API request, the third API request being compatible with a second version of the API and being an input to a second step-up request transformer; transform, via the second step-up request transformer of the computer system, the second API request into a third API request, the third API request being compatible with a third API version and being an input to a handler; transform, via a first step-down response transformer, a first API response from the handler into a second API response, the first API response being compatible with the third version of the API, the second API response being compatible with the second version of the API and an input format of a second step-down response transformer; transform, via the second step-down response transformer, the second API response into a third API response, the third API response being compatible with the first version of the API; output the third API response.

Example 9. The computer system of example 8 wherein the one or more processors is configured to: receive, by a first custom step-down response transformer of the computer system, the third API response; transform, by the first custom step-down response transformer, the third API response into a first custom API response compatible with a customized API modification; output, by the first custom step-down response transformer, the first custom API response.

Example 10. The computer system of example 9, wherein the first custom step-down response transformer is one of a plurality of custom step-down response transformers implemented by the computer system, wherein each of the custom step-down response transformers is configured to receive an API response and transform the API response into a unique API custom response compatible with a corresponding custom modification of a version of the API.

Example 11. The computer system of any of examples 1-10, wherein the receiving comprises: transforming, by a first custom step-up request transformer of the computer system, a custom API request received from a first consumer system, into the first API request.

Example 12. The computer system of example 11, wherein the first custom step-up request transformer is one of a plurality of custom step-up request transformers implemented by the computer system, wherein each of the custom step-up request transformers is configured to receive a unique API request compatible with a corresponding custom modification of a version of the API.

Example 13. The computer system of any of examples 8-12, wherein the first custom step-up request transformer is one of a plurality of custom step-up request transformers implemented by the computer system, wherein each of the custom step-up request transformers is configured to receive a unique API request compatible with a corresponding custom modification of a version of an API.

Example 14. The computer system of any of examples 8-12, wherein the one or more processors are configured to: transform, by a first custom step-up request transformer, a custom API request received from a first consumer system, into the first API request.

Example 15. A non-transitory computer-readable storage medium having instructions stored thereon, that when executed by processing circuitry of a device, causing the processing circuitry to: receive a first application programming interface (API) request compatible with a first version of an API; transform, via a first step-up request transformer, the first API request into a second API request, the third API request being compatible with a second version of the API and being an input to a second step-up request transformer; transform, via the second step-up request transformer of the computer system, the second API request into a third API request, the third API request being compatible with a third API version and being an input to a handler; transform, via a first step-down response transformer, a first API response from the handler into a second API response, the first API response being compatible with the third version of the API, the second API response being compatible with the second version of the API and an input format of a second step-down response transformer; transform, via the second step-down response transformer, the second API response into a third API response, the third API response being compatible with the first version of the API; and output the third API response.

Example 16. The non-transitory computer-readable storage medium of example 15, wherein the computer-readable storage medium is configured to cause the processing circuitry to: receiving, by a first custom step-down response transformer implemented by processing circuitry, the third API response; transforming, by the first custom step-down response transformer, the third API response into a first custom API response compatible with a customized API modification; outputting, by the first custom step-down response transformer, the first custom API response.

Example 17. The non-transitory computer-readable storage medium of example 16, wherein the first custom step-down response transformer is one of a plurality of custom step-down response transformers implemented by the computer system, wherein each of the custom step-down response transformers is configured to receive an API response and transform the API response into a unique API custom response compatible with a corresponding custom modification of a version of the API.

Example 18. The non-transitory computer-readable storage medium of any of examples 15-17, wherein the computer-readable storage medium is configured to cause the processing circuitry to: transform, by a first custom step-up request transformer, a custom API request received from a first consumer system, into the first API request.

Example 19. The non-transitory computer-readable storage medium of example 18, wherein the first custom step-up request transformer is one of a plurality of custom step-up request transformers implemented by the computer system, wherein each of the custom step-up request transformers is configured to receive a unique API request compatible with a corresponding custom modification of a version of the API.

Example 20. The non-transitory computer-readable storage medium of example 15, wherein: the instructions that cause the processing circuitry to receive the first API request comprise instructions that, when executed, cause the processing circuitry to receive, by an initial step-up transformer of the computer system, an initial AI request from a first consumer system, and the instructions, when executed, further cause the processing circuitry to: transform sequentially, by a plurality of step-up transformers of the computer system, the initial API request into the first API request; and output, by a last step-up transformer of the plurality of step-up transformers, the first API request.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers, processing circuitry, or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by processing circuitry (e.g., one or more processors, such as one or more DSPs, general purpose microprocessors, ASICs, FPGAs, or other equivalent integrated or discrete logic circuitry), as well as any combination of such components. Accordingly, the term "processor" or "processing circuitry" as used herein, may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A computer-implemented method comprising:

receiving, by a computer system and from a first consumer system of a plurality of consumer systems, a first custom application programming interface (API) request compatible with a first custom modification of a first version of an API;

transforming, by a first custom step-up request transformer of a plurality of custom step-up request transformers, the first custom API request into a first API request, the first API request being compatible with the first version of the API and being input to a first step-up request transformer, wherein each custom step-up request transformer of the plurality of custom step-up request transformers is compatible with a different custom modification of a plurality of custom modifications of the first version of the API;

transforming, by the first step-up request transformer of the computer system, the first API request into a second API request, the second API request being compatible with a second version of the API and being an input to a second step-up request transformer of the computer system;

transforming, by the second step-up request transformer, the second API request into a third API request, the third API request being compatible with a third version of the API and being an input to a handler;

transforming, by a first step-down response transformer of the computer system, a first API response from the handler into a second API response, the first API response being compatible with the third version of the API, the second API response being compatible with the second version of the API and being an input to a second step-down response transformer of the computer system;

transforming, by the second step-down response transformer, the second API response into a third API response, the third API response being compatible with the first version of the API;

transforming, by a first custom step-down response transformer of a plurality of custom step-down response transformers, the third API response into a first custom API response, the first custom API response being compatible with the first custom modification of the first version of the API;

outputting, by the computer system and to the first consumer system, the first custom API response;

receiving, by the computing system and from a second consumer system of the plurality of consumer systems, a second custom API request compatible with a second custom modification of the first version of the API, wherein the first custom modification of the first version of the API and the second custom modification of the first version of the API are included in the plurality of custom modifications of the first version of the API, and wherein different custom modifications of the first version of the API in the plurality of custom modifications of the API restrict or add features to the first version of the API for different subsets of the plurality of consumer systems;

transforming sequentially, by a second custom step-up request transformer of the plurality of custom step-up request transformers, the first step-up request transformer, and the second step-up request transformer, the second custom API request into a fourth API request compatible with the third version of the API and being an input to the handler;

transforming sequentially, by the first step-down response transformer, the second step-down response transformer, and a second custom step-down response transformer of the plurality of custom step-down response transformers, a fourth API response into a second custom API response, the second custom API response compatible with the second custom modification of the first version of the API; and outputting, by the computing system and to the second consumer system, the second custom API response.

2. The computer-implemented method of claim 1, wherein the plurality of custom step-down response transformers are implemented by the computer system, each of the plurality of custom step-down response transformers is compatible with at least one of the first version of the API, the second version of the API, or the third version of the API, and each of the plurality of custom step-down response transformers is configured to receive an API response and transform the API response into a unique API custom response compatible with a corresponding custom modification of a version of the API.

3. The computer-implemented method of claim 1 wherein the plurality of custom step-up request transformers are implemented by the computer system and each of the plurality of custom step-up request transformers is configured to receive a unique API request compatible with the corresponding custom modification of the first version of the API.

4. The computer-implemented method of claim 1, wherein the plurality of custom step-up request transformers include at least one custom step-up request transformer compatible with the second version of the API or the third version of the API.

5. The computer-implemented method of claim 1, wherein each of the plurality of custom step-up request transformers are configured to implement comparatively more or comparatively fewer features than the first version of the API.

6. A computer system comprising:

one or more processors implemented in circuitry; and one or more memories storing processor-executable instructions that, when executed by the one or more processors, cause the one or more processors to perform operations comprising:

receiving, from a first consumer system of a plurality of consumer systems, a first custom application programming interface (API) request compatible with a first custom modification of a first version of an API;

transforming, by a first custom step-up request transformer of a plurality of custom step-up request transformers, the custom API request into a first API request, the first API request being compatible with the first version of the API and being input to a first step-up request transformer, wherein each custom step-up request transformer of the plurality of custom step-up request transformers is compatible with a different custom modification of a plurality of custom modifications of the first version of the API;

transforming, via the first step-up request transformer, the first API request into a second API request, the second API request being compatible with a second version of the API and being an input to a second step-up request transformer;

transforming, via the second step-up request transformer of the computer system, the second API request into a third API request, the third API request being compatible with a third version of the API and being an input to a handler;

transforming, via a first step-down response transformer, a first API response from the handler into a second API response, the first API response being compatible with the third version of the API, the second API response being compatible with the second version of the API and an input format of a second step-down response transformer;

transforming, via the second step-down response transformer, the second API response into a third API response, the third API response being compatible with the first version of the API;

transforming, by a first custom step-down response transformer of a plurality of custom step-down response transformers, the third API response into a first custom API response, the first custom API response being compatible with the first custom modification of the API;

outputting, to the first consumer system, the first custom API response;

receiving, from a second consumer system of the plurality of consumer systems, a second custom API request compatible with the first version of the API, wherein the first custom modification of the first version of the API and the second custom modification of the first version of the API are included in the plurality of custom modifications of the first version of the API, and wherein different custom modifications of the first version of the API in the plurality of custom modifications of the API restrict or add features to the first version of the API for different subsets of the plurality of consumer systems;

transforming sequentially, by a second custom step-up request transformer of the plurality of custom step-up request transformers, the first step-up request transformer and the second step-up request transformer, the second custom API request into a fourth API request compatible with the third version of the API and being an input to the handler;

transforming sequentially, the first step-down response transformer, the second step-down response transformer and a second custom step-down response transformer of the plurality of custom step-down response transformers, a fourth API response into a second custom API response, the second custom API response compatible with the second custom modification of the first version of the API; and outputting, to the second consumer system, the second custom API response.

7. The computer system of claim 6, wherein the plurality of custom step-down response transformers are implemented by the computer system, each of the plurality of custom step-down response transformers is compatible with at least one of the first version of the API, the second version of the API, or the third version of the API, and each of the custom step-down response transformers is configured to receive an API response and transform the API response into a unique API custom response compatible with a corresponding custom modification of a version of the API.

8. The computer system of claim 6, wherein the plurality of custom step-up request transformers are implemented by the computer system and each of the plurality of custom step-up request transformers is configured to receive a unique API request compatible with a corresponding custom modification of the first version of the API.

9. The computer system of claim 6, wherein the plurality of custom step-up request transformers are implemented by the computer system, and each of the plurality of custom step-up request transformers is configured to receive a unique API request compatible with the corresponding custom modification of the first version of the API.

10. One or more non-transitory computer-readable storage media having processor-executable executable instructions stored thereon that, when executed by one or more processors of a computing system, cause the one or more processors to:

receive, from a first consumer system of a plurality of consumer systems, a first custom application programming interface (API) request compatible with a first custom modification of a first version of an API;

transform, by a first custom step-up request transformer of a plurality of custom step-up request transformers, the first custom API request into a first API request, the first API request being compatible with the first version of the API and being input to a first step-up request transformer, wherein each custom step-up request transformer of the plurality of custom step-up request transformers is compatible with a different custom modification of a plurality of custom modifications of the first version of the API;

transform, via the first step-up request transformer, the first API request into a second API request, the second API request being compatible with a second version of the API and being an input to a second step-up request transformer;

transform, via the second step-up request transformer of the computer system, the second API request into a third API request, the third API request being compatible with a third version of the API and being an input to a handler;

transform, via a first step-down response transformer, a first API response from the handler into a second API response, the first API response being compatible with the third version of the API, the second API response being compatible with the second version of the API and an input format of a second step-down response transformer;

transform, via the second step-down response transformer, the second API response into a third API response, the third API response being compatible with the first version of the API;

transform, by a first custom step-down response transformer of a plurality of custom step-down response transformers, the third API response into a first custom API response, the first custom API response being compatible with the first custom modification of the API;

output, to the first consumer system, the first custom API response;

receive, from a second consumer system of the plurality of consumer systems, a second custom API request compatible with a second custom modification of the first version of the API, wherein the first custom modification of the first version of the API and the second custom modification of the first version of the API are included in the plurality of custom modifications of the first version of the API, and wherein different custom modifications of the first version of the API in the plurality of custom modifications of the API restrict or add features to the first version of the API for different subsets of the plurality of consumer systems;

transform sequentially, by a second custom step-up request transformer of the plurality of custom step-up request transformers, the first step-up request transformer, and the second step-up request transformer, the second custom API request into a fourth API request compatible with the third version of the API and being an input to the handler;

transform sequentially, by the first step-down response transformer, the second step-down response transformer and a second custom step-down response transformer of the plurality of custom step-down response transformers, a fourth API response into a second custom API response, the second custom API response compatible with the second custom modification of the first version of the API; and output, to the second consumer system, the second custom API response.

11. The one or more non-transitory computer-readable storage media of claim 10, wherein the plurality of custom step-down response transformers are implemented by the computer system, wherein each of the plurality of custom step-down response transformers is compatible with at least one of the first version of the API, the second version of the API, or the third version of the API, and wherein each of the custom step-down response transformers is configured to receive an API response and transform the API response into a unique API custom response compatible with a corresponding custom modification of a version of the API.

12. The one or more non-transitory computer-readable storage media of claim 10, wherein the plurality of custom step-up request transformers are implemented by the computer system and wherein each of the plurality of custom step-up request transformers is configured to receive a unique API request compatible with a corresponding custom modification of the first version of the API.

* * * * *